Nov. 23, 1926.
C. P. EISENHAUER
1,608,091
AUTOMATIC WATER SOFTENER
Filed August 18, 1925   8 Sheets-Sheet 4
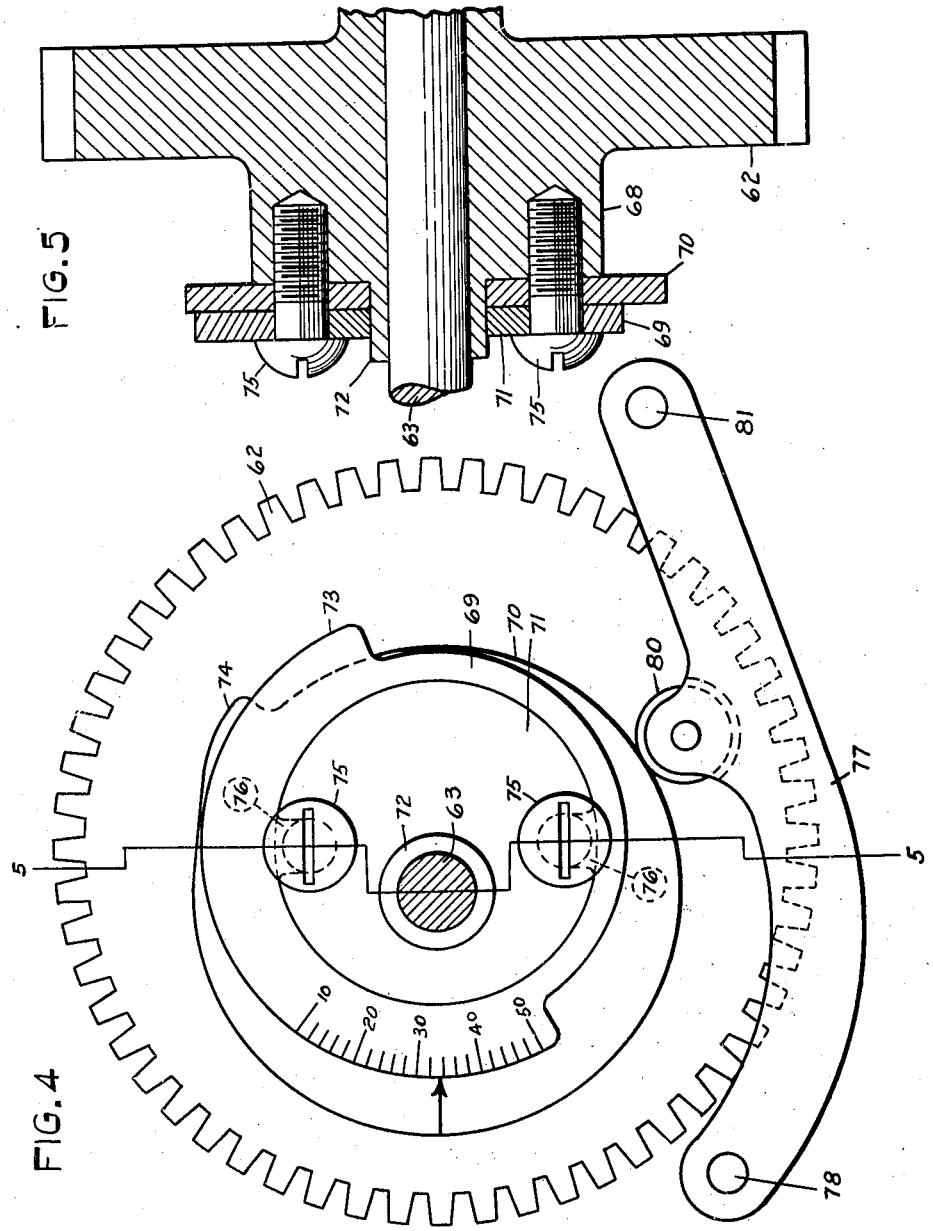
INVENTOR
CHARLES P. EISENHAUER
BY Toulmin & Toulmin,
ATTORNEYS Nov. 23, 1926.

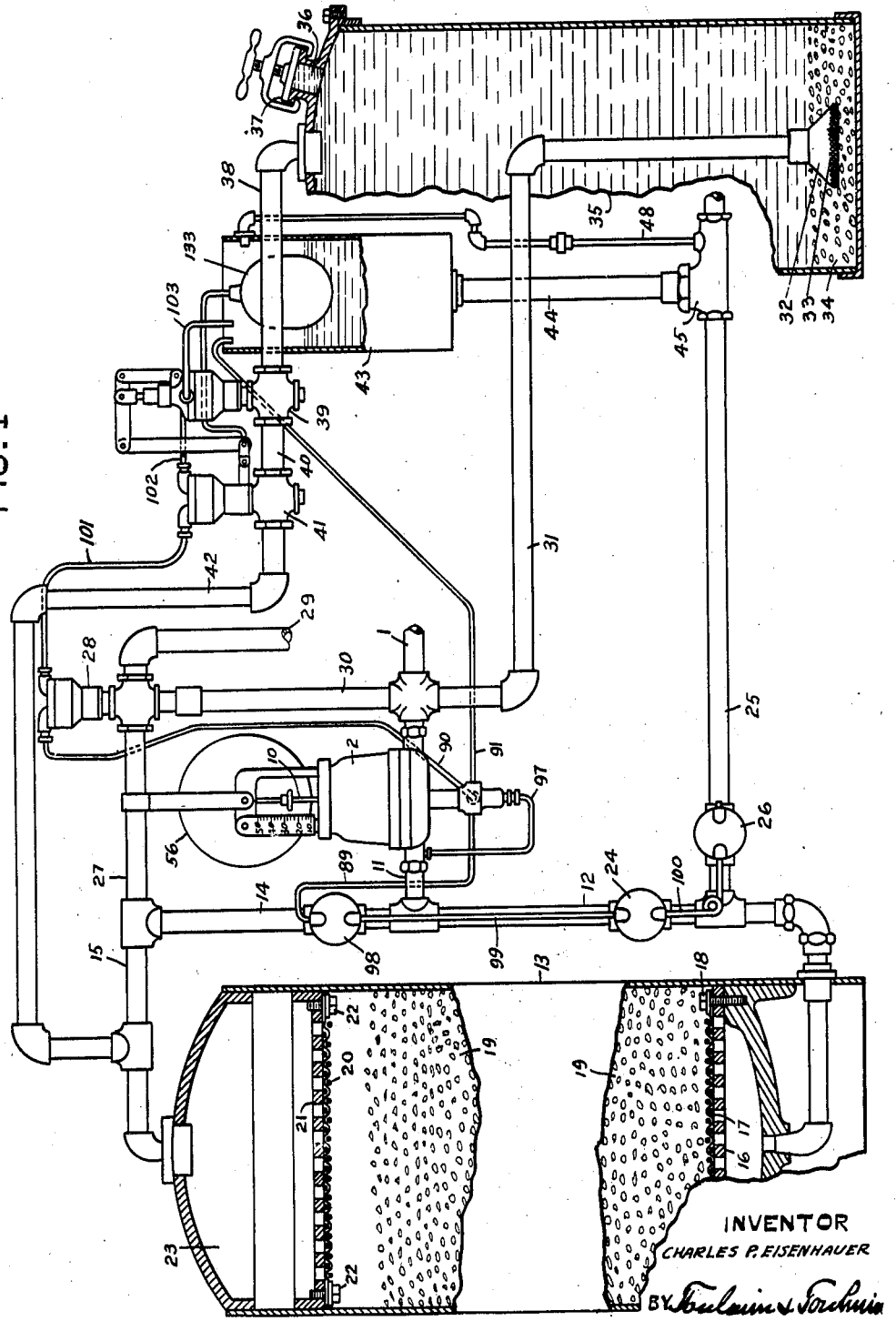

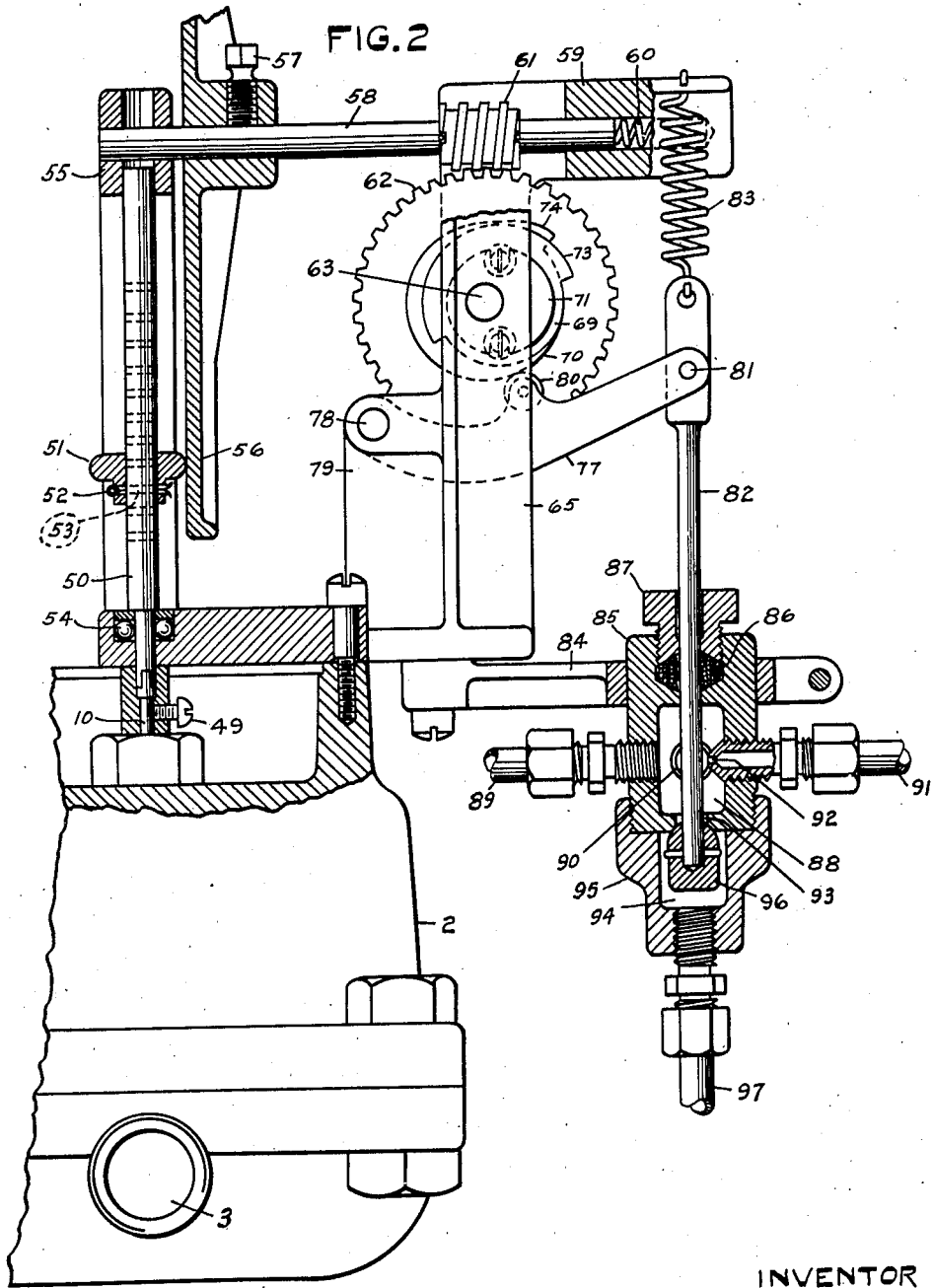

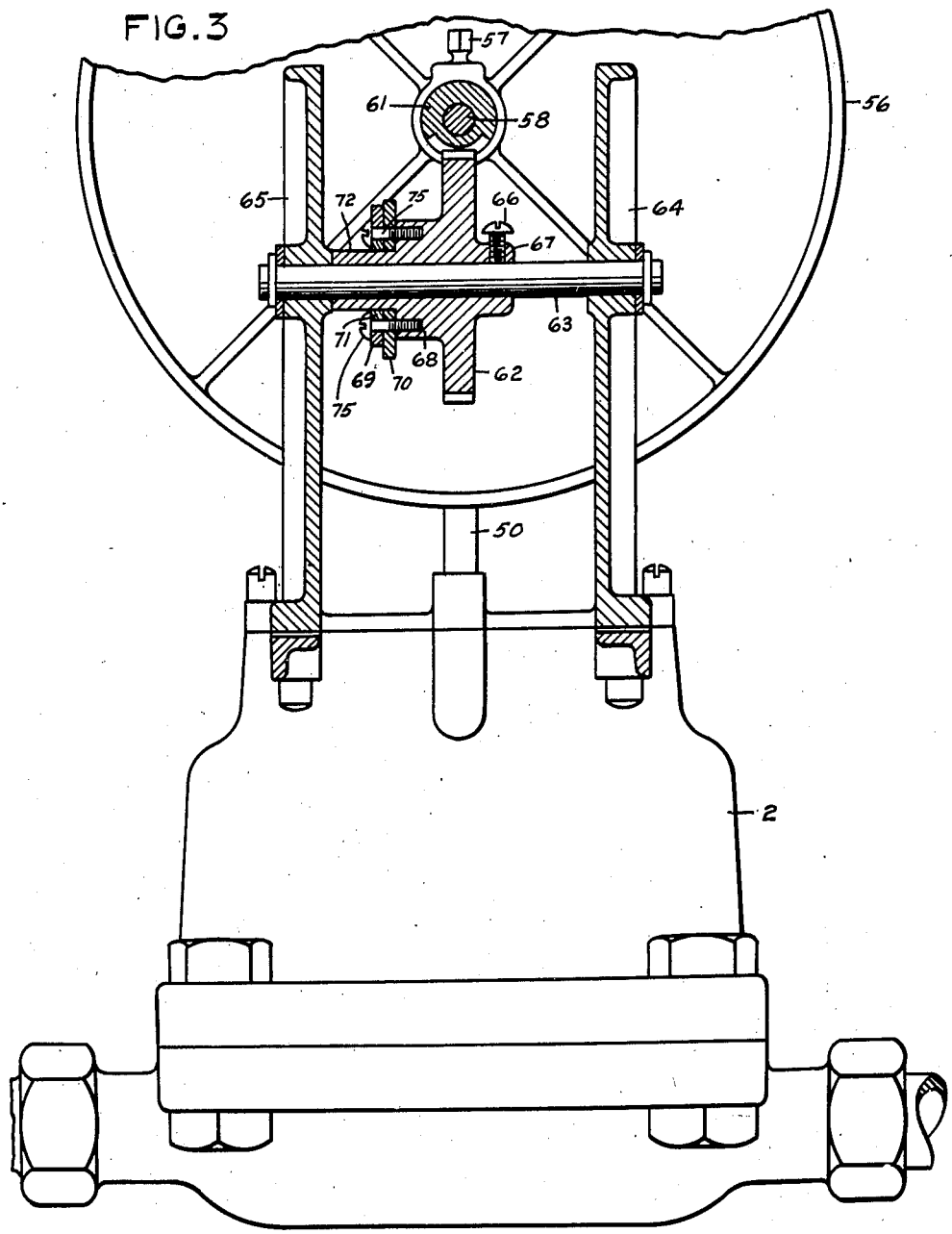

C. P. EISENHAUER

AUTOMATIC WATER SOFTENER

Filed August 18, 1925   8 Sheets-Sheet 5

1,608,091

INVENTOR
CHARLES P. EISENHAUER
BY *Tonlemin & Tonlemin,*
ATTORNEYS

Nov. 23, 1926.  
C. P. EISENHAUER  
AUTOMATIC WATER SOFTENER  
Filed August 18, 1925   8 Sheets-Sheet 6
1,608,091
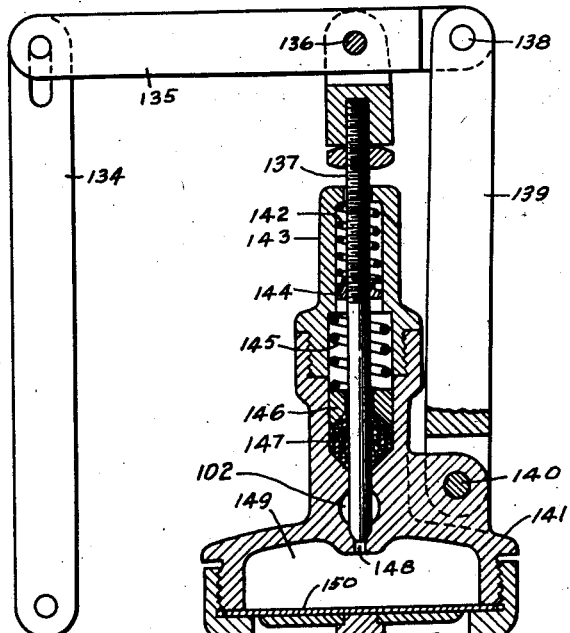
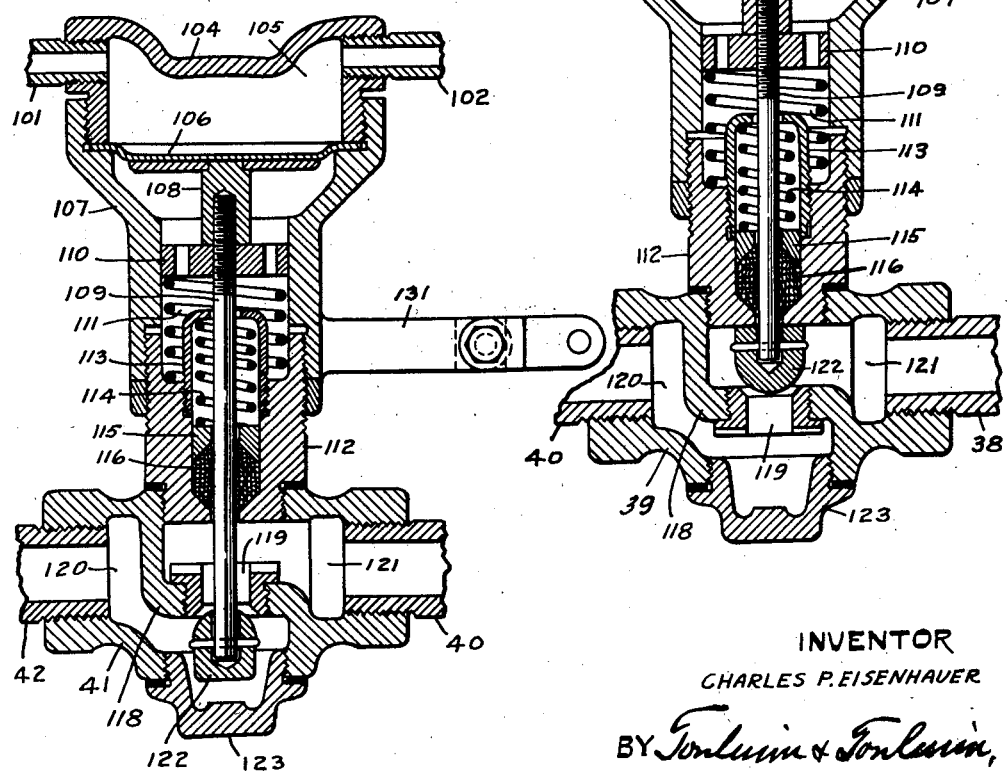
INVENTOR  
CHARLES P. EISENHAUER  
BY Tomlinson & Tomlinson,  
ATTORNEYS Nov. 23, 1926. 1,608,091
C. P. EISENHAUER
AUTOMATIC WATER SOFTENER
Filed August 18, 1925   8 Sheets-Sheet 7
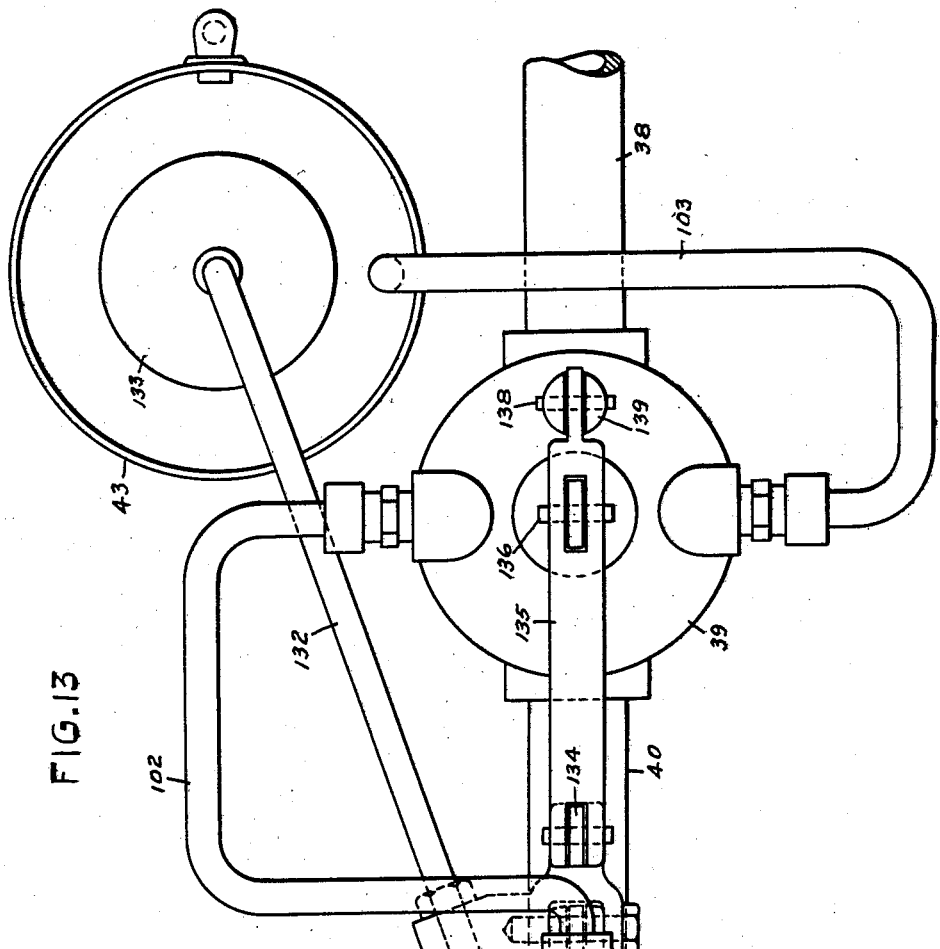
FIG.13
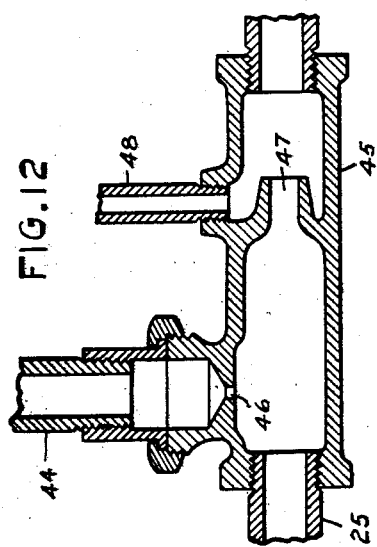
FIG.12
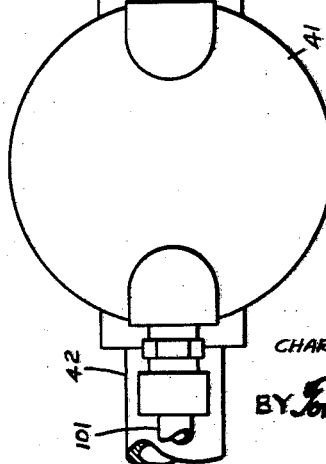
INVENTOR
CHARLES P. EISENHAUER
BY *Fonlunie & Fonlunie*
ATTORNEYS

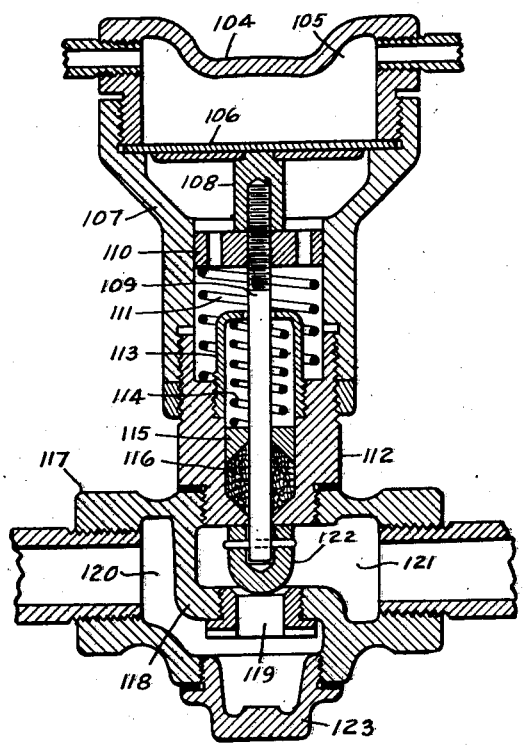

Patented Nov. 23, 1926.

1,608,091

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

AUTOMATIC WATER SOFTENER.

Application filed August 18, 1925. Serial No. 51,014.

My invention relates to water softening systems and in particular to an automatic system employing a brine tank under pressure.

It is the object of my invention to provide an automatic water softening system which will automatically soften the water and regenerate itself, such system being characterized by the use of a meter for operating a control mechanism, the incoming hydrostatic pressure doing the actual work of operating the system, and further characterized by the use of a brine tank under pressure.

It will be understood that when I refer to a water meter, I refer to any mechanism which may be operated by the incoming water in order to move the mechanism to control the application of hydrostatic pressure to the operating valves.

Referring to the drawings:

Figure 1 is a side elevation of the system with the softening tank, brine tank and a portion of the float control tank in section;

Figure 2 is an elevation partially in section of the operating mechanism for the control valve and the control valve;

Figure 3 is a rear elevation of this mechanism partially in section;

Figure 4 is a detail view in elevation of the cams and cam lever operated by the water meter for controlling the needle valve;

Figure 5 is a section on the line 5—5 of Figure 4;

Figure 10 is a section through the refill valve;

Figure 11 is a section through the brine valve at right angles to the section of the top of the brine valve in Figure 7;

Figure 12 is a section through the drain fitting for the float control tank and float control overflow line;

Figure 13 is a plan view of the refill valve, brine valve, float control tank and float mechanism;

Figure 14 is a section of a valve which is normally open but is closed by hydrostatic pressure, such as the bottom line valve.

Figure 6:
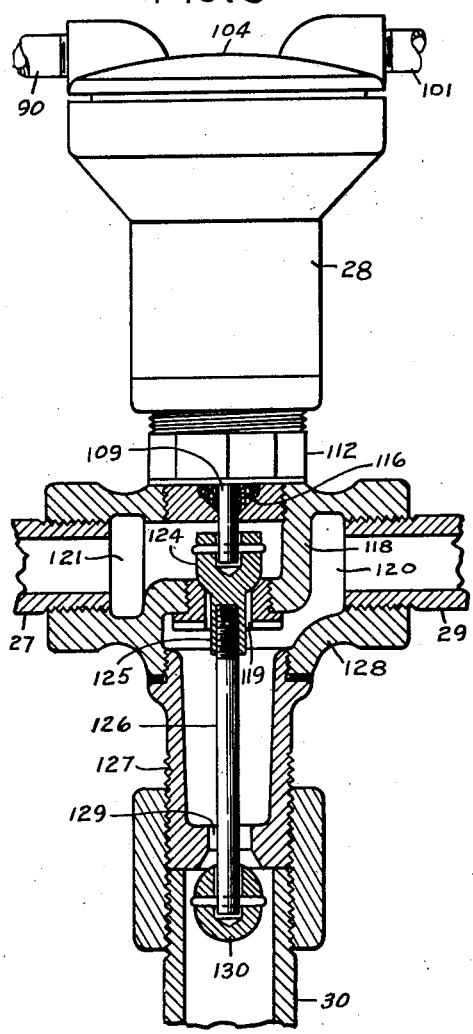
Figure 6 is an elevation partially in section of the by-pass valve.

In general, the operation of this system is as follows.

The incoming hard water during softening operation passes by the meter to the bottom of the softener, up through the softener and out the top and thence to service. The incoming hard water operates the meter or other mechanism of similar kind turning the cams which control the operation of the needle control valve. When the high point of the cam is reached, this valve is open allowing hydrostatic pressure from the incoming hard water line to operate the valves to reverse the system and to regenerate the softening material.

This results in the hard water passing to the top of the softening tank, down to the bottom of the tank and out a drain. Connected to the drain pipe is a float tank in which water is diverted from the drain line.

In the meanwhile, the hard water under pressure is passing to the bottom of the salt tank forcing salt water out at the top and thence to the top of the softening tank. The salt water is allowed to pass through the salt water line due to the fact that all valves in this line are open, one valve being normally open and the other being opened by the hydrostatic pressure admitted during regeneration. This salt water continues to flow until the float rises to a point to admit hydrostatic pressure to the second valve in the drain line closing the valve.

The hard water continues to flow through the softening tank to flush it of salt until the high point of the cam has passed by the cam roller which controls the cam arm in the needle valve, when the system is switched to softening again. The water then drains from the float tank allowing the float to drop to its initial position. The change over to softening position relieves the hydrostatic pressure in the valves in the drain line thereby opening one of the valves and closing the other.

The float tank is drained of any surplus water by an overflow pipe and injector in the drain line.

Referring to the drawings in detail, 1 is

Figure 8:
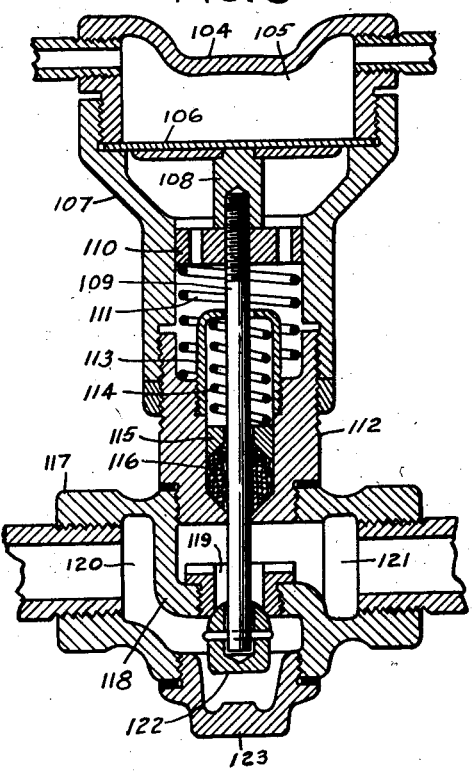
Figure 8 is a section through one of the typical control valves.
Figure 9:
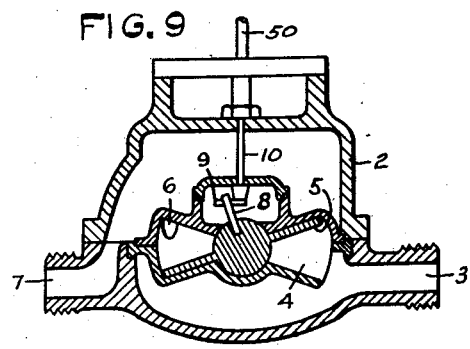
Figure 9 is a section through a typical form of water actuating mechanism or meter mechanism.
Figure 7:
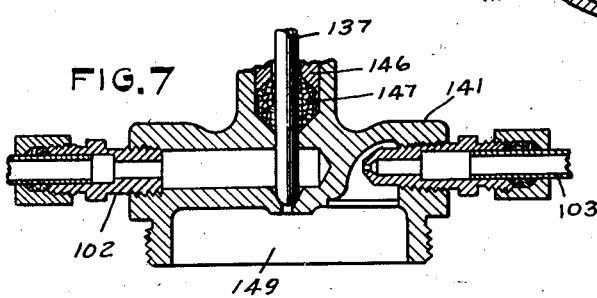
Figure 7 is a section through the incoming and outgoing pressure lines and hydrostatic chamber of the salt valve.

As to the construction of the valves, the valve 98 and the valve 26 are respectively like the valve shown in Figure 8. The valve designated 24 is like that shown in Figure 14, that is, the valves 26 and 98 are normally closed by the spring and are opened by the hydrostatic pressure, while the valve 24 is normally open and is closed by the hydrostatic pressure.

The valves are alike, save that in one of the valves, the valve member is above the partition and is normally open and in the other, the valve member is below the partition and is normally closed.

Referring to these valves, 104 is a casing to form a hydrostatic chamber 105 above the diaphragm 106 which is held between the casing 104 and the casing 107.

A member 108 connects the valve stem 109 to the diaphragm. This valve stem carries a disc 110 against which the valve spring 111 engages, the other end being seated within the casing 112 threaded within the casing 107. Within the casing 112 is a washer spring cage 113, a spring 114, a washer 115 and packing 116. This casing 112 is screwed into the fitting 117 in which there is a partition 118 having an opening 119 to permit the communication between the chambers 120 and 121.

A valve member 122 is carried on the valve stem for closing this opening 119. 123 designates a drain plug.

Referring to the by-pass valve shown in Figure 6, the mechanism for operating it is the same as that shown in Figure 8. There is some difference in the valve member which follows.

A special valve member 124 is attached to the valve stem and has depending from it an internally threaded sleeve 125 carrying a supplementary valve stem 126 which extends into a tubular member 127 threaded in the bottom of the fitting 128. The bottom of this tubular member 127 is provided with a restricted opening 129 which is adapted to be closed by a valve member 130. The pipe 30 communicates with the bottom of the tubular member 127. Thus, when one valve member is open, the other is closed and vice versa.

Referring to the control mechanism for the salt line, the first valve is generally designated as the valve 41 or the salt shut-off valve which is shut during softening. This valve is shown in Figure 10 in its open position, but is normally closed. It is similar in construction to the valve in Figure 8. For convenience it carries on its casing a frame 131 on which is pivoted a float arm 132 carrying a float 133 which rides in the float tank. Connected to this float arm is a link 134, at the upper end of which is a rocking link 135 pivotedly connected at 136 to a needle valve stem 137 and fulcrumed at 138 on the vertical support 139 pivoted at 140 on the casing 141 forming the top of the diaphragm chamber of the salt shut-off valve 39. This needle valve stem 137 is provided with a spring 142 fitting around the valve stem 137 engaging at one end with the casing 143 and the other end with the shoulder 144 of the valve stem. A packing spring 145, a packing washer 146 and a packing 147 is also provided within the casing. This needle valve stem closes an orifice 148 which leads into the diaphragm chamber 149 above the diaphragm 150. To this diaphragm is connected a valve stem and valve member, as described in connection with Figure 14.

*Operation.*

During softening, the valve 98 is closed, the valve 26 is closed, the by-pass valve is closed in the by-pass line but open in the service line, and the salt shut-off valve during softening is closed. The salt shut-off valve 39 is open while the bottom line valve is open.

Upon the high point of the cam being reached and the control valve being open, the hydrostatic pressure opens the valve 98, closes the valve 24 and opens the valve 26. The by-pass valve is so operated that the service line is closed from the softener and the hard water, through the by-pass line 30, is admitted into the service line. The hard water flows through the line 31 to the bottom of the salt tank out the top by the pipe 38 and is permitted to pass through the pipe 42 to the top of the salt tank because the hydrostatic pressure has opened the salt softening shut-off valve 41. The valve 39 is open as it has yet not been operated. The outgoing water through the drain line 25 is partially by-passed in the float tank 43 where it lifts the float 133 and the float arm 132 until the needle valve 137 is lifted against the spring and the hydrostatic pressure is admitted to the diaphragm 150 closing the valve. This shuts off further flow of salt water. Any additional water which accumulates in the tank 43 is taken out through the by-pass overflow pipe 148. As soon as the regeneration has finished and some of the water having passed through the softener to wash out the salt after the closure of the salt water supply, the system is again converted to softening position and the water drains from the tank 43, and the hydrostatic pressure behind the valves drains into the tank 43. Eventually, the float drops down closing the needle valve and relieving the diaphragm 150 from pressure so that the valve opens.

It will be understood that I desire to comprehend within my invention such modifications as may be necessary to adapt it to varying conditions and uses.

Having thus fully described my inven- squarely against the inner or bottom wall of the said socket. The operator then uses a hammer, striking the outer plug in the direction of the length of the axle whereby the wheel is jarred loose from the axle and the key thereof and may be quickly removed.

Having described the invention what is claimed is—

A device adapted to be used for removing a wheel from an axle upon which it is keyed comprising a body provided at its opposite ends with alined sockets of different sizes, and anvil plugs fitting in the sockets.

In testimony whereof I affix my signature.

CASH A. CLEMONS.

operated by hydrostatic pressure, a drain line connected to the bottom line, a sealed salt tank, a line leading from the hard water line to said salt tank, a line leading from said salt tank to the top of the softening tank, valves in said lines for controlling the passage of salt water, a drain valve, a bottom line valve, a top line valve, a drain from the control valve, means to supply water to a float control tank, a float control tank, a float and float arm associated with said tank connected to one of said salt valves whereby the control of the periods of regeneration and softening is effected by the incoming hard water which operates the control valve allowing hydrostatic pressure to operate the valve controlling the passage of fluid for softening and regenerating, and the incoming hard water forcing the salt water from the salt tank into the softening material.

6. In an automatic water softening apparatus arranged for upward softening and downward regeneration, a hard water line, branches connecting said line to the top and bottom of a softening tank, a softening tank adapted to contain softening material therein between screens at either end, screens, meter mechanism operated by the incoming hard water, cam mechanism operated thereby, a needle control valve adapted to be opened by said cam, and yielding means to close said needle valve, means connecting said needle valve with the incoming hard water line and means connecting said needle valve to a plurality of valves to be operated by hydrostatic pressure, a drain line connected to the bottom line, a sealed salt tank, a line leading from the hard water line to said tank, a line leading from said tank to the top of the softening tank, valves in said lines for controlling the passage of salt water, a drain valve, a bottom line valve, a top line valve, a drain from the control valve, means to supply water to a float control tank, a float control tank, a float and float arm associated with said tank connected to one of said salt valves whereby the control of the periods of regeneration and softening is effected by the incoming hard water which operates the control valve allowing hydrostatic pressure to operate the valve controlling the passage of fluid for softening and regenerating, and the incoming hard water forcing the salt water from the salt tank into the softening material, and a supplementary means connected with the drain for draining the surplus water from the float control tank and injector means adapted to facilitate the evacuation of said surplus.

7. In an automatic water softening apparatus arranged for upward softening and downward regeneration, a hard water line, branches connecting said line to the top and bottom of a softening tank, a softening tank adapted to contain softening material therein between screens at either end, screens, meter mechanism operated by the incoming hard water, cam mechanism operated thereby, a needle control valve adapted to be opened by said cam, and yielding means to close said needle valve, means connecting said needle valve with the incoming hard water line and means connecting said needle valve to a plurality of valves to be operated by hydrostatic pressure, a drain line connected to the bottom line, a sealed salt tank, a line leading from the hard water line to said tank, a line leading from said tank to the top of the softening tank, valves in said lines for controlling the passage of salt water, a drain valve, a bottom line valve, a top line valve, a drain from the control valve, means to supply water to a float control tank, a float control tank, a float and float arm associated with said tank connected to one of said salt valves whereby the control of the periods of regeneration and softening is effected by the incoming hard water which operates the control valve allowing hydrostatic pressure to operate the valve controlling the passage of fluid for softening and regenerating, and the incoming hard water forcing the salt water from the salt tank into the softening material, said valves being operated in one direction yieldingly by yielding means and the other direction by said hydrostatic means.

8. In an automatic water softening apparatus arranged for upward softening and downward regeneration, a hard water line, branches connecting said line to the top and bottom of the softening tank, a softening tank adapted to contain softening material therein between screens at either end, screens, meter mechanism operated by the incoming hard water, cam mechanism operated thereby, a needle control valve adapted to be opened by said cam, and yielding means to close said needle valve, means connecting said needle valve with the incoming hard water line and means connecting said needle valve to a plurality of valves to be operated by hydrostatic pressure, a drain line connected to the bottom line, a sealed salt tank, a line leading from the hard water line to said tank, a line leading from said tank to the top of the softening tank, valves in said lines for controlling the passage of salt water, a drain valve, a bottom line valve, a top line valve, a drain from the control valve, means to supply water to a float control tank, a float control tank, a float and float arm associated with said tank connected to one of said salt valves whereby the control of the periods of regeneration and softening is effected by the incoming hard water which operates the control valve allowing hydrostatic pressure to operate the valve controlling the passage of fluid for soften-